US012182541B2

(12) United States Patent
Tartan et al.

(10) Patent No.: US 12,182,541 B2
(45) Date of Patent: Dec. 31, 2024

(54) IN-SCRIPT FUNCTIONS WITHIN A BLOCKCHAIN TRANSACTION

(71) Applicant: nChain Licensing AG, Zug (CH)

(72) Inventors: Chloe Tartan, London (GB); Bassem Ammar, London (GB); Jack Davies, London (GB); Wei Zhang, London (GB); Owen Vaughan, London (GB); Craig Steven Wright, London (GB); Jad Wahab, London (GB)

(73) Assignee: nChain Licensing AG, Zug (CH)

( * ) Notice: Subject to any disclaimer, the term of this patent is extended or adjusted under 35 U.S.C. 154(b) by 203 days.

(21) Appl. No.: 17/611,552

(22) PCT Filed: Apr. 22, 2020

(86) PCT No.: PCT/IB2020/053817
§ 371 (c)(1),
(2) Date: Nov. 15, 2021

(87) PCT Pub. No.: WO2020/240299
PCT Pub. Date: Dec. 3, 2020

(65) Prior Publication Data
US 2022/0300257 A1   Sep. 22, 2022

(30) Foreign Application Priority Data
May 24, 2019   (GB) ..................... 1907347

(51) Int. Cl.
*G06F 9/44*   (2018.01)
*G06F 8/30*   (2018.01)
(Continued)

(52) U.S. Cl.
CPC ................ *G06F 8/311* (2013.01); *H04L 9/50* (2022.05)

(58) Field of Classification Search
CPC . G06F 8/311; G06F 9/448; G06F 9/52; H04L 9/50; G06Q 20/02; G06Q 20/065; G06Q 20/3678; G06Q 2220/00
See application file for complete search history.

(56) References Cited

U.S. PATENT DOCUMENTS 6,578,192 B1    6/2003  Boehme et al.
10,693,637 B2 *  6/2020  Ramesh ............ G06Q 20/3827
(Continued)

FOREIGN PATENT DOCUMENTS

WO   2017145006        8/2017
WO   2018116104 A1     6/2018
(Continued)

OTHER PUBLICATIONS

Alexandra Covaci, NECTAR: Non-Interactive Smart Contract Protocol using Blockchain Technology, 2018, pp. 1-8. https://ieeexplore.ieee.org/stamp/stamp.jsp?tp=&arnumber=8445053 (Year: 2018).*
(Continued)

*Primary Examiner* — Mongbao Nguyen
(74) *Attorney, Agent, or Firm* — Messner Reeves LLP

(57) ABSTRACT

A method of executing a transaction of a blockchain. The transaction comprises at least one output comprising a locking script, and the locking script comprises an instance of a first opcode and one or more instances of a second opcode. Each instance of the second opcode separates portions of the locking script. Upon calling the instance of the first opcode, a first data element is read from at least one stack, the first data element being generated during execution of the locking script with an unlocking script of a different transaction. A first part of the locking script that follows an instance of the second opcode corresponding to the first data element is output.

17 Claims, 7 Drawing Sheets

(51) Int. Cl.
   *G06F 9/445* (2018.01)
   *G06F 9/455* (2018.01)
   *H04L 9/00* (2022.01)

(56) References Cited

U.S. PATENT DOCUMENTS

| | | | |
|---|---|---|---|
| 11,568,505 B2* | 1/2023 | Hunn | G06Q 50/188 |
| 2019/0102758 A1 | 4/2019 | Wright et al. | |
| 2019/0116024 A1 | 4/2019 | Wright et al. | |
| 2019/0130394 A1 | 5/2019 | Stollman et al. | |
| 2019/0156301 A1* | 5/2019 | Bentov | G06Q 20/405 |
| 2019/0349428 A1* | 11/2019 | Kovacheva | G06F 8/65 |
| 2021/0233074 A1* | 7/2021 | Kramer | G06Q 20/065 |

FOREIGN PATENT DOCUMENTS

| | | | | |
|---|---|---|---|---|
| WO | 2018116105 A1 | 6/2018 | | |
| WO | 2018215872 A1 | 11/2018 | | |
| WO | WO-2018215951 A1 * | 11/2018 | | G06F 16/2379 |
| WO | WO-2019034959 A1 * | 2/2019 | | G06F 16/258 |
| WO | WO-2019043538 A1 * | 3/2019 | | G06F 16/2365 |
| WO | WO-2019092544 A1 * | 5/2019 | | G06F 16/27 |
| WO | WO-2019092552 A1 * | 5/2019 | | G06K 9/621 |

OTHER PUBLICATIONS

Nahid A. Ali, Alneelain: A Formal Specification Language, 2019, pp. 1-9. https://ieeexplore.ieee.org/stamp/stamp.jsp?tp=&arnumber=7867678 (Year: 2017).*
Christopher Jamthagen, Blockchain-based publishing layer for the Keyless Signing Infrastructure, 2016, pp. 1-8. https://ieeexplore.ieee.org/stamp/stamp.jsp?tp=&arnumber=7816868 (Year: 2016).*
Guy Zyskind, Efficient Secure Computation Enabled by Blockchain Technology, 2016, pp. 1-28. https://dspace.mit.edu/bitstream/handle/1721.1/105933/964695278-MIT.pdf (Year: 2016).*
Tooba Faisal, The Evolution of Embedding Metadata in Blockchain Transactions, 2018, pp. 1-9. https://arxiv.org/pdf/1806.06738 (Year: 2018).*
English translation Covaci (WO2019092544 A1), 2019, pp. 1-24. (Year: 2019).*
Andreas M. Antonopoulus: "Mastering Bitcoin—Unlocking Digital Cryptocurrencies" In: "Mastering bitcoin : [unlocking digital cryptocurrencies]", Dec. 20, 2014, pp. 132-134, O'Reilly Media, Beijing Cambridge Farnham Koln Sebastopol Tokyo.
EP23159633.9 Search Report dated Jun. 9, 2023, 5 pages.
https://github.com/Maguines/Bitcoin-v0.1/blob/master/study/script.cpp [Accessed on Apr. 24, 2019].
https://github.com/bitcoin/bitcoin/blob/master/src/script/interpreter.cpp [Accessed on Apr. 24, 2019].
https://www.yours.org/content/the-unfuckening-of-op_return-b10d2c4b52da [Accessed on Apr. 24, 2019].
Marvin Minsky (1967), Computation: Finite and Infinite Machines, Prentice-Hall, Inc. Englewood Cliffs, N.J.
https://en.bitcoin.it/wiki/Script [Accessed on Apr. 24, 2019].
Anonymous: "OP_CHECKSIG-Bitcoin Wiki", Jan. 16, 2019 (Jan. 16, 2019), XP055657864, Retrieved from the Internet: URL:https://en.bitcoin.it/w/index.php?title=OP_CHECKSIG&oldid=66023 [retrieved on Jan. 14, 2020].
Augustana Digital Commons et al: "Augustana College Data Insertion in Bitcoin's Blockchain Augustana Digital Commons Citation Data Insertion in Bitcoin's Blockchain", SCRIPT. 4. Transaction Malleability. 5. Op Return. 6. Coinbase. 7. Free Speech, Jul. 2017, XP055464096, p. 5, paragraph 3, p. 6-p. 9.
Bitfury Group: "Smart Contracts on Bitcoin Blockchain", Sep. 4, 2015 (Sep. 4, 2015), [retrieved on Jun. 9, 2017] XP055382678, Retrieved from the Internet: URL:http://bitfury.com/content/5-white-papers-research/contracts-1.1.1.pdf.
GB1907345.1 Combined Search and Examination Report dated Nov. 14, 2019, 7 pages.
GB1907346.9 Combined Search and Examination Report dated Feb. 20, 2020, 9 pages.
GB1907347.7 Combined Search and Examination Report dated Nov. 18, 2019, 7 pages.
PCT/IB2020/053816 International Search Report and Written Opinion dated Jul. 17, 2020, 15 pages.
PCT/IB2020/053817 International Search Report and Written Opinion dated Jun. 24, 2020, 12 pages.
PCT/IB2020/053844 International Search Report and Written Opinion dated Jun. 24, 2020, 12 pages.
Bartoletti M., et al., "An Analysis of Bitcoin OP_RETURN Metadata," 2017, Lecture Notes in Computer Science, pp. 218-230.
Fuchita Y., "Special Feature: Innovation and Finance—Blockchain and Financial Transaction Innovation," Nomura Capital Markets Quarterly, Japan, Nomura Institute of Capital Markets Research, Nov. 1, 2015, vol. 19, No. 2, 30 Pages.
Matsuura K., et al., "Introduction: Howto Make Cryptocurrencies," 1st Printing, 1st Edition, Japan, Shuwa System Co., Ltd, Dec. 25, 2018, 11 Pages.
Narayanan A., et al., (Nagao, Takahiro), F, Nd Printing, St Edition, Japan, Nikkei Business Publications, Inc., Dec. 20, 2017, 17 Pages.
Stone System Corporation., "Illustrated Introduction: Up-to-date Easy-to-understand Guide to Blockchain," 4th Printing, 1st Edition, Japan, Shuwa System Co., Ltd, Apr. 15, 2018, 18 Pages.

* cited by examiner

Figure 4

Example: (105, 28)

| 28  | OP_TUCK | 28  | OP_MOD | 21 | OP_DUP | 21 | OP_IF | 21 | OP_1      | OP_TUCK |
|-----|---------|-----|--------|----|--------|----|-------|----|-----------|---------|
| 105 |         | 105 |        | 28 |        | 21 |       | 28 | OP_RETURN |         |
|     |         | 28  |        |    |        | 28 |       |    |           |         |
|     |         |     |        |    |        |    |       |    |           |         |
|     |         |     |        |    |        |    |       |    |           |         |

| 21 | OP_MOD | 7  | OP_DUP | 7  | OP_IF | 7  | OP_1      | OP_TUCK |
|----|--------|----|--------|----|-------|----|-----------|---------|
| 28 |        | 21 |        | 7  |       | 21 | OP_RETURN |         |
| 21 |        |    |        | 21 |       |    |           |         |
|    |        |    |        |    |       |    |           |         |
|    |        |    |        |    |       |    |           |         |

| 7  | OP_MOD | 0 | OP_DUP | 0 | OP_IF | 0 | OP_ENDIF | 7 |
|----|--------|---|--------|---|-------|---|----------|---|
| 21 |        | 7 |        | 0 |       | 7 | OP_DROP  |   |
| 7  |        |   |        | 7 |       |   |          |   |
|    |        |   |        |   |       |   |          |   |
|    |        |   |        |   |       |   |          |   |

Figure 5

Example: (7, G)

| | | | | | | | | |
|---|---|---|---|---|---|---|---|---|
| G | OP_0 | 2 | OP_TOALTSTACK | 1 | OP_IF | G | OP_DUP | |
| 7 | OP_TOALTSTACK | 2 | OP_GREATERTHAN | G | | 7 | [POINT_ADD] | |
| | OP_OVER | 7 | | 7 | | G | | |
| | OP_1 | G | | G | | | | |
| | OP_GREATERTHAN | 7 | | | | | | |
| | OP_IF | G | | | | | | |
| | OP_TUCK | | | | | | | |
| | OP_1 | | | | | | | |
| | OP_TOALTSTACK | | | | | | | |
| | OP_OVER | | | | | | | |
| | OP_FROMALTSTACK | | | | | | | |
| | OP_2MUL | | | | | | | |
| | OP_DUP | | | | | | | |

| | | | | | | | |
|---|---|---|---|---|---|---|---|
| 2G | OP_OVER | 4 | OP_TOALTSTACK | 1 | OP_IF | 2G | OP_DUP |
| 7 | OP_FROMALTSTACK | 4 | OP_GREATERTHAN | 2G | | 7 | [POINT_ADD] |
| G | OP_2MUL | 7 | | 7 | | G | |
| | OP_DUP | 2G | | G | | | |
| | | 7 | | | | | |
| | | G | | | | | |

| | | | | | | | |
|---|---|---|---|---|---|---|---|
| 4G | OP_OVER | 8 | OP_TOALTSTACK | 0 | OP_IF | 4G | OP_SWAP |
| 7 | OP_FROMALTSTACK | 8 | OP_GREATERTHAN | 4G | | 7 | OP_FROMALTSTACK |
| G | OP_2MUL | 7 | | 7 | | G | OP_2DIV |
| | OP_DUP | 4G | | G | | | OP_SUB |
| | | 7 | | | | | OP_SWAP |
| | | G | | | | | OP_TOALTSTACK |
| | | | | | | | OP_1 |
| | | | | | | | OP_TOALTSTACK |
| | | | | | | | OP_SWAP |

Figure 5 (cont.)

| | | | | | | | |
|---|---|---|---|---|---|---|---|
| G | OP_OVER | 2 | OP_TOALTSTACK | 1 | OP_IF | G | OP_DUP |
| 3 | OP_1 | 2 | OP_GREATERTHAN | G | | 3 | [POINT_ADD] |
| | OP_GREATERTHAN | 3 | | 3 | | G | |
| | OP_IF | G | | G | | | |
| | OP_TUCK | 3 | | | | | |
| | OP_1 | G | | | | | |
| | OP_TOALTSTACK | | | | | | |
| | OP_OVER | | | | | | |
| | OP_FROMALTSTACK | | | | | | |
| | OP_2MUL | | | | | | |
| | OP_DUP | | | | | | |

| | | | | | | | |
|---|---|---|---|---|---|---|---|
| 2G | OP_OVER | 4 | OP_TOALTSTACK | 0 | OP_IF | 2G | OP_SWAP |
| 3 | OP_FROMALTSTACK | 4 | OP_GREATERTHAN | 2G | | 3 | OP_FROMALTSTACK |
| | OP_2MUL | 3 | | 3 | | | OP_2DIV |
| G | OP_DUP | 2G | | G | | G | OP_SUB |
| | | 3 | | | | | OP_SWAP |
| | | G | | | | | OP_TOALTSTACK |
| | | | | | | | OP_1 |
| | | | | | | | OP_TOALTSTACK |
| | | | | | | | OP_SWAP |

| | | | | | | | |
|---|---|---|---|---|---|---|---|
| G | OP_OVER | G | OP_SWAP | G | OP_FROMALTSTACK | 2G | [POINT_ADD] |
| 1 | OP_1 | 1 | OP_IF | | OP_IF | G | |
| | OP_GREATERTHAN | | | | OP_FROMALTSTACK | | |
| | OP_IF | | | | | | |

Figure 5 (cont.)

| 3G | OP_FROMALTSTACK<br>OP_IF<br>OP_FROMALTSTACK | 4G | [POINT_ADD] | 7G | OP_FROMALTSTACK<br>OP_IF<br>OP_ENDIF | 7G |
|---|---|---|---|---|---|---|
|  |  | 3G |  |  |  |  |
|  |  |  |  |  |  |  |
|  |  |  |  |  |  |  |
|  |  |  |  |  |  |  |
|  |  |  |  |  |  |  |

IN-SCRIPT FUNCTIONS WITHIN A BLOCKCHAIN TRANSACTION

CROSS REFERENCE TO RELATED APPLICATIONS

This application is the U.S. National Stage of International Application No. PCT/IB2020/053817 filed on Apr. 22, 2020, which claims the benefit of United Kingdom Patent Application No. 1907347.7, filed on May 24, 2019, the contents of which are incorporated herein by reference in their entireties.

TECHNICAL FIELD

The present disclosure relates to using transactions of a blockchain to implement in-script composite functions. For instance, the composite functions may be used to create loops within a script of a transaction.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivizes miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the conditions for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly.

Blockchain protocols may use a scripting language for transactions. A script is essentially a list of elements, which may be data or instructions. The instructions are referred to in the literature as, script words, opcodes, commands, or functions. Opcodes (short for operation codes) perform predefined operations on the data within a script.

One blockchain scripting language is a dual stack implementation based on Forth with the exception of any looping functionality. Forth uses a dual stack, with the data stack being the main stack and the return stack being the extra stack.

SUMMARY

One such opcode is OP_RETURN. In the original blockchain protocol, the purpose of OP_RETURN was to terminate execution of a script. It did not invalidate the transaction containing the script. However this led to fraudulent attacks when OP_RETURN was included in the input script(s) of a transaction. Specifically, any input script of a transaction that contained an OP_RETURN could have been used to unlock an output script of a previous transaction. Therefore the protocol was changed so that, in the existing blockchain protocol, the opcode OP_RETURN represents a provably unspendable transaction output, allowing for the storage of data on the blockchain. In the existing protocol, the OP_RETURN opcode is used to terminate the execution of a script and to invalidate the transaction simultaneously. However this results in a loss of functionality within the blockchain because no transaction having an OP_RETURN in its input script can result in a 'TRUE' (or valid) execution when run alongside any unlocking script.

Another opcode is OP_CODESEPARATOR (OCS). OCS is an opcode that is 'visible' to the opcode OP_CHECKSIG, meaning that OP_CHECKSIG can locate where the next OCS is situated in a script. For completeness, in general OP_CHECKSIG will check the signature within a script against all data after the last OCS has been executed.

According to one aspect disclosed herein, there is provided a method of executing a transaction of a blockchain, wherein the transaction comprises at least one output comprising a locking script, wherein the locking script comprises an instance of a first opcode and one or more instances of a second opcode, each Instance of the second opcode separating portions of the locking script, and wherein the method comprises: upon calling the instance of the first opcode, reading a first data element from at least one stack, wherein the first data element is generated during execution of the locking script with an unlocking script of a different transaction; and outputting a first part of the locking script that follows an instance of the second opcode corresponding to the first data element.

Here, the first opcode has visibility of the second opcode, allowing portions of the locking script to be 'selected'. That is, portions of the script situated after a particular instance of the second opcode can be identified and output, e.g. to be executed. This can be used to enable in-script looping, by jumping from one part of the locking script to another, and so on.

The first opcode may be the OP_RETURN opcode. Here, the function of OP_RETURN is redefine—its purpose is no longer to terminate execution of a script and invalidate the transaction. Instead, OP_RETURN receives an identifier or an instance of the second opcode and outputs the script following that instance of the second opcode. In some instances, instead of executing the script from one end to the other, OP_RETURN can be used to jump forwards or backwards to another part of the script. For example, some parts of the script may be executed more than once, and some parts of the script may not be executed at all, or they may be executed in a different order.

The second opcode may be the OP_CODESEPARATOR (OCS) opcode. OCS is placed between portions of a script, effectively separating those portions. OP_RETURN is able to locate instances of OCS within a script in order to output the script following a particular instance.

For brevity, the first opcode will be referred to hereinafter as "OP_RETURN" or a "termination opcode", and the second opcode will be referred to as "OP_CODESEPARATOR" or a "separator opcode". However, the disclosure is not limited to opcodes having those specific labels. More generally, while embodiments will be described in terms of OP_RETURN of a blockchain scripting language, the same teaching can be implemented by any opcode which when called by a script engine (e.g. script interpreter) reads a first data element from a stack and outputs a part of a script following in instance of a second opcode corresponding to that data element. Similarly, while embodiments will be described in terms of OP_CODESEPARATOR, the same teaching can be implemented by any opcode which separates portion of a script and is visible to the first opcode.

Reference to first and second instances of the first opcode should be interpreted as instance of the same type of opcode. Similarly, reference to first and second instances of the second opcode should be interpreted as instance of the same type of opcode, the first and second opcodes being different types of opcode.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 4 is an example of an unpacking of loops from an in-script composite function of the Euclidean algorithm for inputs a=105 and b=28; and FIG. 5 is an example of in-script elliptic curve point multiplication for inputs 7, G.

DETAILED DESCRIPTION OF EMBODIMENTS

Figure 1:
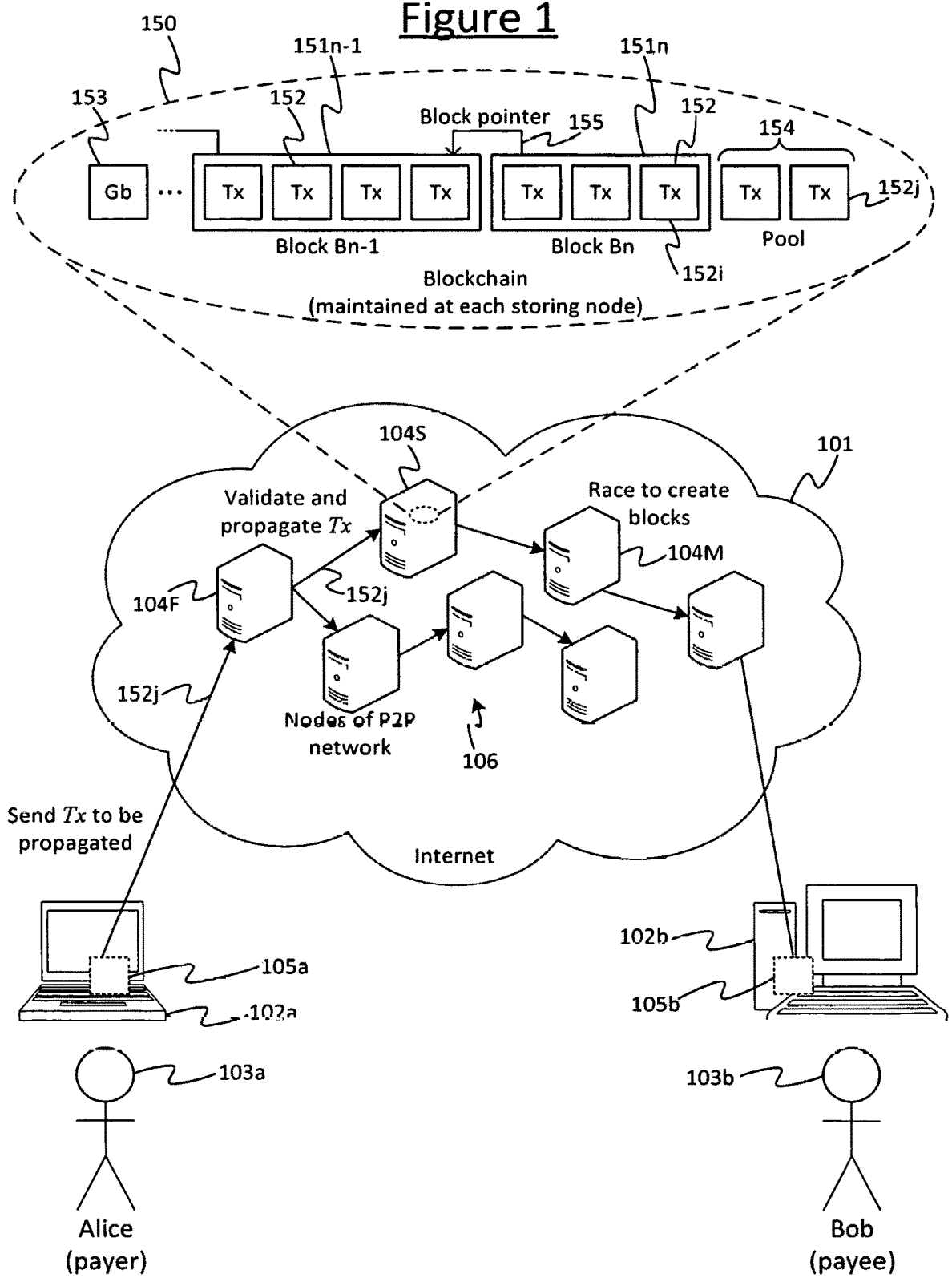
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer to peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated In order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"), This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transaction 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was Included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated, Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the Same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

Figure 2:
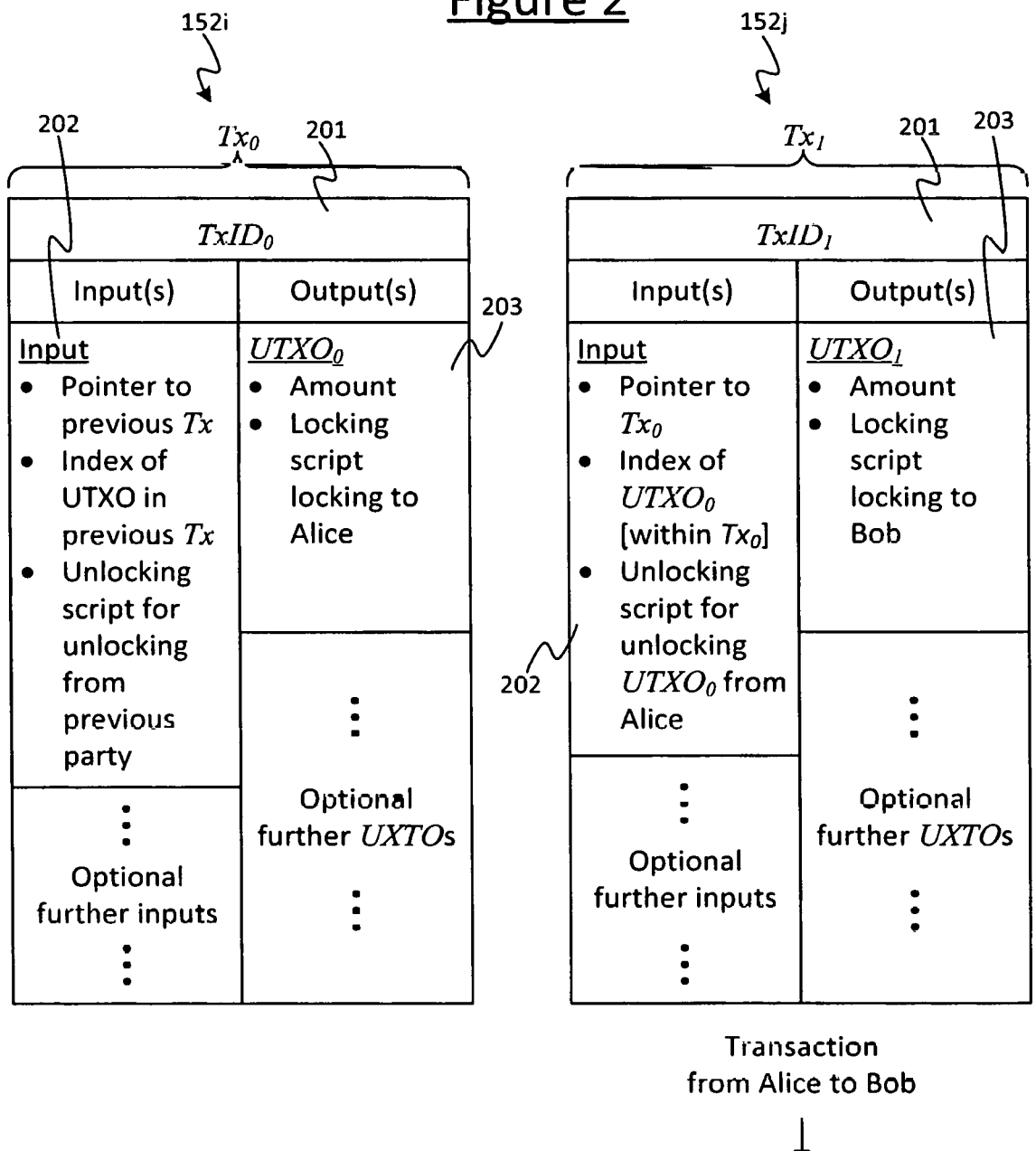
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$> <$P_A$>||[Checksig $P_A$]

where "||" represents a concatenation and "< ... >" means place the data on the stack, and "[ ... ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H($P_A$)> OP_EQUALVERIFY OP_CHECKING. "OP_...," refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Some blockchain protocols use a scripting language which comprises two types of elements: data and opcodes. The data within a script may be, for example, numbers, public keys, signatures, hash values, etc. An opcode is a function that operates on the data within a script. In scripting language, a script is run from one end to the other (usually from left to right) and makes use of a data structure referred to as a "stack". Data is always pushed to (i.e. placed on) the stack. An opcode can pop data off the stack (i.e. take data from the stack), perform an operation on the data, and then optionally "push" new data on to the stack. The stack-based scripting language commonly used in a number blockchains is just called Script. The following will be described in terms of opcodes of the Script language.

Stack-based scripting languages will be familiar to the person skilled in the art. The following example illustrates how an example script implementation. Specifically, an example verification and unlocking process is shown below.

An example script may comprise <Bob's signature> <Bob's public key> OP_DUP OP_HASH <Bob's public address> OP_EQUALVERIFY OP_CHECKSIG. The script is operated on from left to right.

Step 1: Push <Bob's signature> on to the stack

| <Bob's signature> |
|---|

Step 2: Push <Bob's public key> on to the stack (this is now the top element on the stack)

| <Bob's public key> |
|---|
| <Bob's signature> |

Step 3: The OP_DUP opcode operates on the top element on the stack to duplicate <Bob's public key>.

| <Bob's public key> |
|---|
| <Bob's public key> |
| <Bob's signature> |

Step 4: The OP_HASH opcode pops out <Bob's public key> and runs it through a hash algorithm (followed by one or more optional operations) to get <Bob's public address> and place it on the stack.

| <Bob's public address> |
|---|
| <Bob's public key> |
| <Bob's signature> |

Step 5: Push <Bob's public address> to the stack (this is now the top element on the stack).

| <Bob's public address> |
|---|
| <Bob's public address> |
| <Bob's public key> |
| <Bob's signature> |

Step 6: The OP_EQUALVERIFY opcode pops the last two elements off the stack (<Bob's public address> and <Bob's public address>) and checks to see if the two addresses are identical or not. If they are not identical the execution is considered as failed. If the condition is TRUE, the next command gets executed.

| <Bob's public key> |
|---|
| <Bob's signature> |

Step 7: The OP_CHECKSIG opcode pops out <Bob's public key> and <Bob's signature> and checks to see their validity. When this process is complete, Bob can unlock the transaction and access the specified amount of the digital asset

| TRUE |
|---|

In-Script Functions

Embodiments of the present invention provide for implementing in-script composite functions within a blockchain transaction. This is achieved by re-defining the function of OP_RETURN (or alternatively configuring an opcode to perform the functions attributed to OP_RETURN below).

Figure 3:
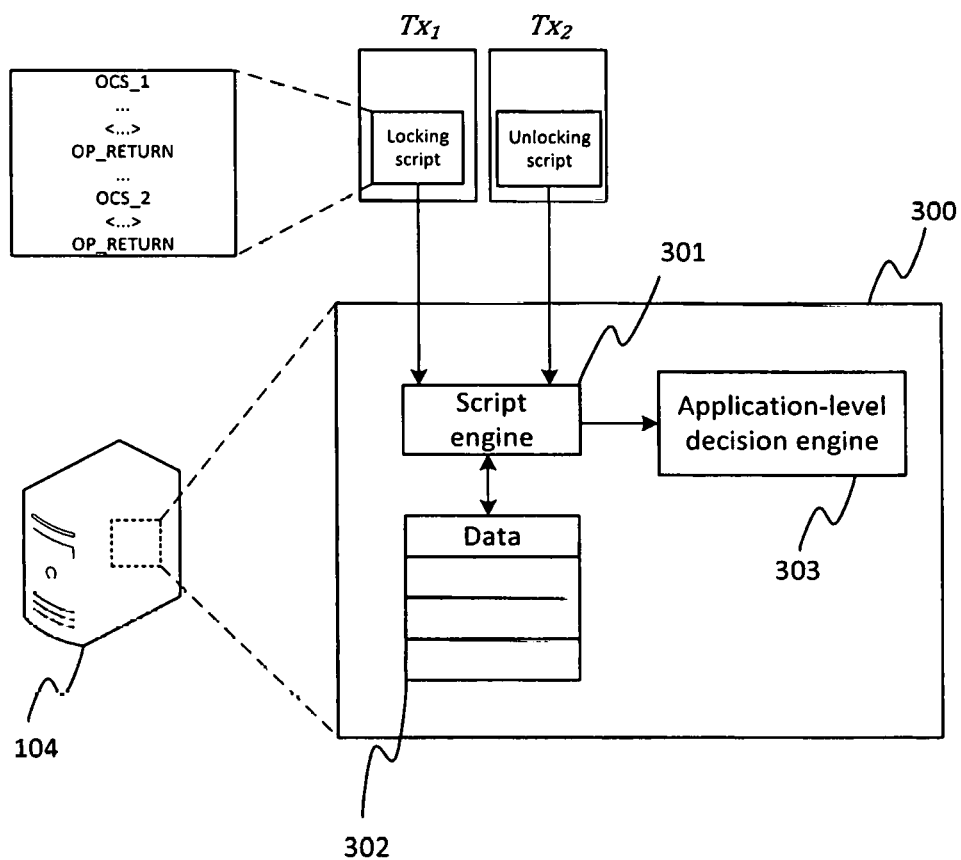
FIG. 3 is a schematic block diagram of node software for executing transactions.

FIG. 3 illustrates an example of the node software 300 that may be run on each node 104 of the blockchain network 106, in the example of a UTXO- or output-based model. The node software 300 comprises, amongst other components, a script engine 301, a stack 302, an application-level decision engine 303. The script engine 301 may comprise a script interpreter that is configured to execute scripts by interpreting parts of the script as data elements or functions for operating on those data elements and/or pushing or reading data elements from the stack 302. Alternatively the script engine 301 could employ another form of execution such as just-in-time (JIT) compilation. Generally, the term "execute" is used herein in its broadest sense of running the script in any way (not in the narrow sense of executing compiled machine code instructions). Hence "executing" can comprise interpreting in the present context. Note also that "opcode" in the present context does not mean the opcode of an individual machine code instruction but rather a higher level command that is mapped to a respective predefined function by the script engine 301 at each node 104.

Whilst not shown, the node software may further comprise a protocol engine and a set of one or more blockchain-related functional modules. At any given node 104, these may include any one, two or all three of: a mining module, a forwarding module and a storing module (depending on the role or roles of the node). The protocol engine is configured to recognize the different fields of a transaction 152 and process them in accordance with the node protocol. When a transaction 152$m$ (TX$_m$) is received having an input pointing to an output (e.g. UTXO) of another, preceding transaction 152$m$-1 (Tx$_{m-1}$), then the protocol engine identifies the unlocking script in Tx$_m$ and passes it to the script engine 401. The protocol engine also identifies and retrieves Tx$_{m-1}$ based on the pointer in the input of Tx$_m$. It may retrieve Tx$_{m-1}$ from the respective node's own pool 154 of pending transactions if Tx$_{m-1}$ is not already on the blockchain 150, or from a copy of a block 151 in the blockchain 150 stored at the respective node or another node 104 if Tx$_{m-1}$ is already on the blockchain 150. Either way, the protocol engine identifies the locking script in the pointed-to output of Tx$_{m-1}$ and passes this to the script engine 301.

The script engine 301 thus has the locking script of Tx$_{m-1}$ and the unlocking script from the corresponding input of Tx$_m$. For example Tx$_1$ and Tx$_2$ are illustrated in FIG. 4, but the same could apply for any pair of transactions, such as Tx$_0$ and Tx$_1$, etc. The script engine 301 runs the two scripts together as discussed previously, which will include placing data onto and retrieving data from the stack 302 in accordance with the stack-based scripting language being used (e.g. Script).

As shown in FIG. 3, the locking script of Tx$_1$ comprises one or more OCS opcodes (two in this example) and at least one OP_RETURN. The script engine 301 is configured to, when calling the OP_RETURN, consume a data element from the top of the stack 402 and interpret that data element as a reference to one of the OCS opcodes included in the locking script of Tx$_1$. The script engine 301 is also configured to execute part of the locking script following the referenced OCS opcode, e.g. by replacing the non-executed part of the locking script with the part of locking script following the referenced OCS opcode.

As stated above, when executing (e.g. validating) a transaction, a locking script of the transaction is executing alongside the unlocking script of a previous transaction. The transaction may comprise more than one locking script. At least one of those locking scripts comprises an OP_RETURN and one or more instances of OP_CODESEPARATOR (OCS). Each instance of OCS separates portions of the locking script. For example, there may be two OCS opcodes separating three portions of the locking script. Unless the context requires otherwise, first, second, third and so on are merely labels to distinguish between different ones of the same item (e.g. OCS, OP_RETURN, portion, etc.).

As part of the validation of a transaction, if the locking script is executed and it comprises an OP_RETURN, when the OP_RETURN is called, a data element is read from one of the stacks (e.g. the Main or Alt stacks). A data element may be read from both stacks and combined (e.g. summed) to form a single data element. The data element is generated during execution of the locking script, e.g. up until the point the OP_RETURN is called. The data element, which may be a number or other type of variable, is used to output a first part of the locking script that follows on from an OCS corresponding to that data element. In other words, the data element is interpreted as an index (or address) of a particular OCS. Here, the "first part of the locking script" does not necessarily mean that it is the foremost part of the locking script. Here, "first" is used as label to refer to part of the locking script—it may or may not be the foremost part depending on the data element read from the stack. E.g. if there are three OCS opcodes within the locking script they may be indexed by the numbers one, two and three. If the data element corresponds to the second OCS within the script, the part of the locking script following the second OCS is output. The part of the locking script may, for example, be added to a script template, added to an instructed set to be executed, and/or executed.

When the first part of the locking script is then executed, if it comprises an instance of OP_RETURN, when that instance of OP_RETURN is called, a data element may be read from the stack and used as an address of an OCS. The same OCS or a different OCS may be referenced, depending on the data element read from the stack. A part of the locking script (referred to as a "second part") following the referenced OCS is output. Following on from the above example, if the data element corresponds to the first OCS within the script, the part of the locking script following the first OCS is output. Alternatively, the data element may correspond to the second or third OCS, in which case the part of the locking script output will be that following the second or third OCS respectively. If the contents of the locking script is chosen accordingly, infinite loops may be created, e.g. by having the same set of OCS opcodes referenced repeatedly.

In some embodiments, each OP_RETURN is preceded in the locking script by an opcode that, when called, pushes a data element to the top of the stack. For instance, each of the opcodes preceding an OP_RETURN may push a data element corresponding to one of the OCS opcodes to the stack.

The script of a transaction may be read, executed, interpreted etc. by a script engine (e.g. a script interpreter). Before executing the locking script, the script engine may scan the locking script for any instances of OP_RETURN. If the locking script does contain at least one instance of OP_RETURN, the script engine may create a subscript that starts with the foremost OCS within the locking script and ends with end of the locking script. This subscript may be stored in memory. When the OP_RETURN is called, a data element from the stack is consumed, e.g. the top element from the Main stack. If the data element is not a positive integer and/or is greater than the total number of OCS opcodes within the subscript, the execution may end. If the data element is a positive integer and is less than or equal to the total number of COS opcodes within the subscript, a part of the locking script following an OCS corresponding to the data element is output. For instance, the unexecuted script (i.e. the part of the locking script following OP_RETURN) is replaced with the part of the subscript that follows the $n^{th}$ OCS, where n is the data element consumed by OP_RETURN.

When executing the script, a main script and the subscript may be saved in memory. The main script is the script to be executed on the stack. The subscript is static and used as a reference script—parts of the subscript will be read and copied. The subscript comprises all of the locking script that follows from an initial OCS within the locking script. The main script is dynamic. Not only will it be consumed as execution progresses but it may also be overwritten by some part of the subscript via OP_RETURN during execution. For instance, each time OP_RETURN is called, the main script will be replaced with part of the subscript (i.e. a part of the original locking script that forms part of the subscript) following an OCS corresponding to a consumed data element.

Use Cases

FIG. 4 illustrates the execution of an example in-script function. This example function performs the Euclidean algorithm. The Euclidean algorithm takes two inputs (a, b), and outputs the greatest common divisor (GCD) of a and b. For simplicity, it is assumed that a>b.

In this example, the inputs a and b are 105 and 28 respectively. The number 105 will be below the number 28 on the stack. The output will be GCD(105, 28). The script to be executed is: OCS OP_TUCK OP_MOD OP_DUP OP_IF OP_1 OP_RETURN OP_ENDIF OP_DROP. It can be seen that the script comprises a single OCS and a single OP_RETURN. The OP_RETURN follows OP_1, which will push a value of 1 to the stack. When OP_RETURN is called, the value of 1, will be read and used to execute the part of the script following the corresponding OCS. Now, due to the OCS being the foremost opcode in the script, this is equivalent to the script being repeated.

As shown in FIG. 4, the output is 7, which is the GCD of 105 and 28. The script, when executed, may be looped one or more times (once in this example). That is, 18 opcodes are called to calculate the greatest common divisor of 105 and 28. However, there are only 9 opcodes required to construct the script. An advantage of this is that larger composite scripts can be implemented from a smaller script that is included in a transaction.

FIG. 5 illustrates the execution of another example in-script function. This example function performs Elliptic Curve Point Multiplication. The input to the function is (a, G), where a is a scalar, and G is a generation point. In this example, a is 7. The output from the function is a G.

The script to-be-executed is as follows:

```
OP_0 OP_TOALTSTACK
OCS_1
OP_OVER OP_1 OP_GREATERTHAN
OP_IF
  OP_TUCK OP_1 OP_TOALTSTACK
  OCS_2
  OP_OVER OP_FROMALTSTACK OP_2MUL OP_DUP OP_TOALTSTACK
  OP_GREATERTHAN
  OP_IF
    OP_DUP [POINT_ADD] OP_2 OP_RETURN
  OP_ELSE
    OP_SWAP OP_FROMALTSTACK OP_2DIV OP_SUB OP_SWAP OP_TOALTSTACK
    OP_1
    OP_TOALTSTACK OP_SWAP OP_1 OP_RETURN
  OP_ENDIF
OP_ELSE
  OP_SWAP
  OP_IF
    OCS_3
    OP_FROMALTSTACK
  OP_IF
    OP_FROMALTSTACK [POINT_ADD] OP_3 OP_RETURN
    OP_ENDIF
  OP_ELSE
    OP_DROP OP_FROMALTSTACK
    OP_IF
      OP_FROMALTSTACK OP_3 OP_RETURN
    OP_ENDIF
  OP_ENDIF
OP_ENDIF
```

In this script there are three instances of the OCS opcode (OCS_1, OCS_2, OCS_3"), each separating different portions of the script. There are four instances of OP_RETURN, each preceded by an opcode which will push a data element corresponding to one of the OCS opcodes to the stack. In this example, each OP_RETURN follows an opcode representing a number. Whenever OP_RETURN is encountered, the first element on the stack is consumed, and the new set of opcodes is copied to a script board to be executed. FIG. 5 shows the evolution of the stacks, which comprises data elements, and the script board, which comprises opcodes up to an instance of OP_RETURN.

As an example, if "OP_DUP [POINT_ADD] OP_2 OP_RETURN" is executed, OP_RETURN will consume the data element '2' from the stack and proceed to execute the script following OCS_2.

The script works as follows:
1) Push 0 to the ALT stack. This 0 help to identify when the bottom of the ALT stack is reached.
2) There are two inputs (a, G). Check whether a>1.
   a. If yes, then proceed to point doubling.
   b. If no, start with point addition.
3) In case of point doubling, start by pushing 1 to the stack. This 1 acts like a counter, recording how many times the point has been doubled. The counter is compared with a. A copy of G is made for future use.
   a. If the counter is greater than a, the counter is reduced by half, and then that value is subtracted from u. This creates a new value of a, which is smaller than the original value.
   b. Meanwhile, a result from the doubling will be pushed to the ALT stack. After that, 1 will be pushed to the ALT stack to indicate that there is a value to fetch from the ALT stack.
   c. OP_RETURN is then used to go to Step 2 with the new value of a.
4) When there is no more doubling that can be done, it is checked whether a=1 or a=0.

a. If a=1, each element on the ALT stack is fetched one by one and point addition is performed until the bottom of the stack is reached.
b. If a=0, first drop G, and then fetch one result from the ALT stack, then go back to step "a." above.

Note that point addition is defined by [POINT_ADD] and point doubling is defined by OP_DUP [POINT_ADD] (or [POINT_DOUBLE]), as an abbreviation for a large group of opcodes. [POINT_ADD] consumes the first two elements $P_1$ and $P_2$ on the stack and pushes the point addition of $P_1$ and $P_2$ to the stack. [POINT_DOUBLE] consumes the first element P on the stack and pushes the point 2P to the stack.

It will be appreciated that the above embodiments have been described by way of example only. To be clear, embodiments are not limited to opcodes having a particular "name". Rather, the embodiments are limited to opcodes having a particular function. The terms "OP_RETURN" and "OP_CODESEPARATOR" have been used for the sake of brevity.

According to a first instantiation of the teachings disclosed herein, there is provided a computer-implemented method of executing a transaction of a blockchain, wherein the transaction comprises at least one output comprising a locking script, wherein the locking script comprises an instance of a first opcode and one or more instances of a second opcode, each instance of the second opcode separating portions of the locking script, and wherein the method comprises: upon calling the instance of the first opcode, reading a first data element from at least one stack, wherein the first data element is generated during execution of the locking script with an unlocking script of a different transaction; and outputting a first part of the locking script that follows an instance of the second opcode corresponding to the first data element.

The first opcode may be a termination opcode. The second opcode may be a separator opcode.

According to a second, optional instantiation, there may be provided a method in accordance with the first instantiation, wherein said outputting may comprise executing at least some of the first part of the locking script.

According to a third, optional instantiation, there may be provided a method in accordance with the first or second instantiations, wherein the method may comprise: creating a subscript that starts from a first instance of the second opcode and is followed by a remainder of the locking script that would be executed after the first instance of the second opcode, wherein the first part of the locking script is a first part of the subscript.

According to a fourth, optional instantiation, there may be provided a method in accordance with any of the first to third instantiations, wherein the locking script and the subscript may be stored in memory of the node, and wherein said outputting may comprise replacing an unexecuted part of the locking script with the first part of the subscript in the memory.

According to a fifth, optional instantiation, there may be provided a method in accordance with the third or fourth instantiations, the method may comprise: before executing the locking script, scanning the locking script for any instance of the first opcode; and if the locking script comprises any instances of the opcode, creating said subscript.

According to a sixth, optional instantiation, there may be provided a method in accordance with any of the first to fifth instantiations, wherein the method may comprise interpreting the first data element as an address of the instance of the second opcode.

According to a seventh, optional instantiation, there may be provided a method in accordance with any of the first to sixth instantiations, wherein the method may comprise terminating execution of the locking script if at least one of: the first data element is not a positive integer; and the first data element is greater than a total number of instances of the second opcodes.

According to an eighth, optional instantiation, there may be provided a method in accordance with any of the first to seventh instantiations, wherein the first part of the locking script may comprise a second instance of the first opcode, and wherein the method may comprise: upon calling the second instance of the first opcode, reading a second data element from at least one stack, wherein the second data element is generated during execution of first part of the locking script; and outputting a second part of the locking script that follows an instance of the second opcode corresponding to the second data element.

According to a ninth, optional instantiation, there may be provided a method in accordance with the eighth instantiation, wherein said outputting of the second part of the locking script may comprise executing at least some of the second part of the locking script.

According to a tenth, optional instantiation, there may be provided a method in accordance with any of the first to ninth instantiations when dependent on the fourth instantiation, wherein the second part of the locking script may be a second part of the subscript, and wherein the method may comprises replacing an unexecuted part of the first part of the locking script with the second part of the subscript in the memory.

According to an eleventh instantiation of the teachings disclosed herein, there is provided a computer program embodied on computer-readable storage and configured so as, when run on the node of the blockchain network, to perform any of first to tenth instantiations.

According to a twelfth instantiation of the teachings disclosed herein, there is provided computing equipment comprising: memory comprising one or more memory units; and processing apparatus comprising one or more processing units, wherein the memory stores code arranged to run on the processing apparatus, the code being configured so as when run on the processing apparatus to perform any of first to tenth instantiations.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of executing a first transaction of a blockchain, wherein the first transaction comprises at least one output comprising a locking script, wherein the locking script comprises an instance of a first opcode and multiple instances of a same second opcode, each instance of the same second opcode separating portions of the locking script, and wherein the method is performed by a node of a blockchain network, and the node of the blockchain network being configured to:

upon calling the instance of the first opcode, a script engine comprises a script interpreter that is configured to execute scripts by interpreting parts of the script as data elements, the script engine of the node reading a first data element of the data elements from at least one stack, wherein the first data element is generated during execution, by the script engine, of the locking script with an unlocking script of the second, different transaction;

the script engine outputting a first part of the locking script that follows an instance of the second opcode corresponding to the first data element, and executing, by the node of the blockchain network, at least some of the first part of the locking script outputted by the script engine.

2. The computer-implemented method of claim 1, comprising:

creating a subscript that starts from a first instance of the second opcode and is followed by a remainder of the locking script that would be executed after the first instance of the second opcode, wherein the first part of the locking script is a first part of the subscript.

3. The computer-implemented method of claim 2, wherein the locking script and the subscript are stored in memory of the node of a blockchain network, and wherein said outputting comprises replacing an unexecuted part of the locking script with the first part of the subscript in the memory.

4. The computer-implemented method of claim 2, comprising:

before executing the locking script, scanning the locking script for any instance of the first opcode; and determining that the locking script comprises any instance of the first opcode; and in response, creating said subscript.

5. The computer-implemented method of claim 3, wherein the second part of the locking script is a second part of the subscript, and wherein the method comprises replacing an unexecuted part of the first part of the locking script with the second part of the subscript in the memory.

6. The computer-implemented method of claim 1, comprising interpreting the first data element as an address of the instance of the second opcode.

7. The computer-implemented method of claim 1, comprising terminating execution of the locking script in response to determining that at least one of: the first data element is not a positive integer; and the first data element is greater than a total number of instances of the second opcode.

8. The computer-implemented method of claim 1, wherein the first part of the locking script comprises a second instance of the first opcode, and wherein the method comprises:
upon calling the second instance of the first opcode, reading a second data element from the at least one stack, wherein the second data element is generated during execution of the first part of the locking script; and
outputting a second part of the locking script that follows an instance of the second opcode corresponding to the second data element.

9. The computer-implemented method of claim 8, wherein said outputting of the second part of the locking script comprises executing at least some of the second part of the locking script.

10. A non-transitory computer-readable storage medium storing computer program code configured, when run on a node of a blockchain network to causes the node to perform a method of:
a script engine of the node executing a first transaction of a blockchain, wherein the first transaction comprises at least one output comprising a locking script, wherein the locking script comprises an instance of a first opcode and multiple instances of a same second opcode, each instance of the same second opcode separating portions of the locking script, wherein the script engine comprises a script interpreter that is configured to execute scripts by interpreting parts of the script as data elements, and wherein the node of the blockchain network is configured to:
upon calling the instance of the first opcode, the script engine of the node reading a first data element of the data elements, from at least one stack, wherein the first data element is generated during execution of the locking script with an unlocking script of a second, different transaction;
the script engine outputting a first part of the locking script that follows an instance of the second opcode corresponding to the first data element, and
executing, by the node of the blockchain network, at least some of the first part of the locking script outputted by the script engine.

11. The non-transitory computer-readable storage medium of claim 10, wherein the computer program code, when run on the node of the blockchain network, causes the node to perform the step of:
creating a subscript that starts from a first instance of the second opcode and is followed by a remainder of the locking script that would be executed after the first instance of the second opcode, wherein the first part of the locking script is a first part of the subscript.

12. The non-transitory computer-readable storage medium of claim 11, wherein the locking script and the subscript are stored in memory of the node, and wherein said outputting comprises replacing an unexecuted part of the locking script with the first part of the subscript in the memory.

13. The non-transitory computer-readable storage medium of claim 11, wherein the computer program code, when run on the node of the blockchain network, causes the node to perform the steps of:
before executing the locking script, scanning the locking script for any instance of the first opcode; and
determining that the locking script comprises any instance of first the opcode; and
in response, creating said subscript.

14. The non-transitory computer-readable storage medium of claim 10, wherein the computer program code, when run on the node of a blockchain network, causes the node to perform the step of interpreting the first data element as an address of the instance of the second opcode.

15. A computing equipment, comprising:
a memory comprising one or more memory-partitions; and
a processing apparatus comprising one or more processors, wherein the memory stores code arranged to run on the processing apparatus, the code being configured when run on the processing apparatus to causes the processing apparatus to carry out a method of executing a first transaction of a blockchain, wherein the first transaction comprises at least one output comprising a locking script, wherein the locking script comprises an instance of a first opcode and multiple instances of a same second opcode, each instance of the same second opcode separating portions of the locking script, and wherein the processing apparatus being configured to:
upon calling the instance of the first opcode, a script engine comprises a script interpreter that is configured to execute scripts by interpreting parts of the script as data elements, the script engine of the node reading a first as data element of the data elements from at least one stack, wherein the first data element is generated during execution of the locking script with an unlocking script of a second, different transaction;
the script engine outputting a first part of the locking script that follows an instance of the second opcode corresponding to the first data element, and
executing, by the node of the blockchain network, at least some of the first part of the locking script outputted by the script engine.

16. The computing equipment of claim 15, wherein the code is configured when run on the processing apparatus to causes the processing apparatus to perform the step of:
creating a subscript that starts from a first instance of the second opcode and is followed by a remainder of the locking script that would be executed after the first instance of the second opcode, wherein the first part of the locking script is a first part of the subscript.

17. The computing equipment of claim 16, wherein the locking script and the subscript are stored in memory of a node, and wherein said outputting comprises replacing an unexecuted part of the locking script with the first part of the subscript in the memory.

* * * * *